United States Patent [19]

Tsuchiyama

[11] Patent Number: 5,216,897
[45] Date of Patent: Jun. 8, 1993

[54] PREVENTING SIMULTANEOUS START OF AIR CONDITIONERS DURING RECOVERY FROM A POWER FAILURE

[75] Inventor: Yuji Tsuchiyama, Nitta, Japan

[73] Assignee: Sanyo Electric Co., Ltd., Osaka, Japan

[21] Appl. No.: 827,710

[22] Filed: Jan. 27, 1992

[30] Foreign Application Priority Data

Feb. 6, 1991 [JP] Japan .................................. 3-15247

[51] Int. Cl.$^5$ .......................................... G05D 23/32
[52] U.S. Cl. ...................................... 62/158; 62/230
[58] Field of Search ................ 62/158, 230, 229, 157, 62/231, 175; 236/46 R, 46 F; 165/12

[56] References Cited

U.S. PATENT DOCUMENTS

| | | | |
|---|---|---|---|
| 3,864,611 | 2/1975 | Chang | 62/158 X |
| 4,417,450 | 11/1983 | Morgan, Jr. et al. | 62/231 X |
| 4,749,881 | 6/1988 | Uhrich | 62/158 X |
| 4,898,230 | 2/1990 | Tsuchiyama et al. | 165/12 |

FOREIGN PATENT DOCUMENTS

| | | | |
|---|---|---|---|
| 59-30818 | 9/1984 | Japan . | |
| 0165452 | 8/1985 | Japan | 62/158 |
| 62-43391 | 11/1987 | Japan . | |

*Primary Examiner*—Harry B. Tanner
*Attorney, Agent, or Firm*—Wenderoth, Lind & Ponack

[57] ABSTRACT

An apparatus can prevent a voltage drop a the power supply that would occur when AC power is supplied to a large number of air conditioners from the same power supply simultaneously as when recovering from a power failing. The timing of applying the reset signal to a microprocessor in the apparatus is set arbitrarily by a time setting circuit. A time setting switch is used to set to an arbitrary value for the time elapsed from the generation of the reset signal to the start of an air conditioner compressor. According to the setting of this switch, the microprocessor performs a control to change the delay time for the start of the air conditioner. When the power is restored after a power failure, it is possible to prevent the air conditioners from restarting simultaneously and therefore reduce the voltage drop in the power supply.

3 Claims, 10 Drawing Sheets

PREVENTING SIMULTANEOUS START OF AIR CONDITIONERS DURING RECOVERY FROM A POWER FAILURE

BACKGROUND OF THE INVENTION

The present invention relates in general to a controller for an air conditioner and, more particularly, to the controller for preventing the simultaneous starting of a plurality of air conditioner compressors, the air conditioners being driven by the same AC power source, when the AC power is restored after a power failure.

A conventional controller for an air conditioner having a refrigeration cycle is disclosed in Japanese Utility Model Publication No. 59-30818/1984. The controller disclosed therein has an operation switch for starting and stopping the air conditioner, a thermostat, and a compressor, all connected in series with an AC power source. With this series connection, when the operation switch in the operating positions (i.e., positions of high power cooling, medium power cooling, light power cooling) and the thermostat is turned on, the compressor is energized and started. The timer is always turned on.

When a plurality of conventional air conditioners are driven by the same AC power source, as in a case where several hundred rooms in a hotel are each provided with an air conditioner, a power failure caused by trouble occurring outside the hotel facilities will stop all of the air conditioners until the power is restored. When the power is restored, the compressors are immediately and automatically restarted.

The arrangement of the conventional air conditioners described above, however, has disadvantages. Suppose a power failure occurs when several hundreds of air conditioners are in operation. When the power is restored, all of the air conditioners simultaneously start, that is, several hundred compressors are started at once, causing a great amount of starting electric current to flow in the power supply system, which in turn causes a voltage drop in the AC power. One solution to this problem is an increase of the capacity of the AC power source but this requires substantially larger power facilities as compared to that required for the normal operation.

Japanese Utility Model Publication No. 62-43391/1987 discloses a controller which has microcomputer with a reset circuit for resetting microcomputer when electric power is supplied. The reset circuit has a voltage detector which outputs a reset signal when a DC voltage from a constant voltage circuit becomes higher than a predetermined voltage, and a timer circuit for delaying, for a predetermined length of time, the output of the voltage detection and then supplies it to the reset terminal of the microcomputer. The reset circuit resets the microcomputer after a predetermined time period from the time when the DC voltage becomes higher than the predetermined voltage. This configuration ensures the reset of the microcomputer only after the voltage to the microcomputer is completely established and, therefore, the microcomputer is reliably started in accordance with an initialization program therefor.

In the controller for the air conditioners with microcomputers as described above, the delay times of the reset signals are distributed over a range to some extent among different microcomputers because of the characteristic variations of electronic parts in each of the microcomputers, which sometimes permits, by chance, reduction of the starting current at the time of power restoration. However, the range of delay time distribution is limited, so that the starting current cannot be reduced sufficiently, with the result that large power facilities are still required.

SUMMARY OF THE INVENTION

An object of the present invention is to solve the problems encountered with the conventional controller for the air conditioners.

Another object of the present invention is to provide an improved controller for an air conditioner, which can distribute the restart timings of the compressors at the time of power restoration to thereby reduce the starting current.

Briefly, the present invention provides a control apparatus for an air conditioner comprising a refrigeration circuit having a compressor driven by AC power from an AC power source, a condenser, an expansion device and an evaporator so that the condenser, the expansion device and the evaporator are connected by suitable refrigerant conduits in a refrigerant flow relationship. The control apparatus has an operation switch which is set to either a start position or a stop position. While electric power is being supplied to the control apparatus, the AC power supplied to the compressor is automatically controlled. In an embodiment of the invention, the start of the automatic supply/stop control of the AC power can be delayed for a predetermined period of time after the AC power is supplied.

When a plurality of the air conditioners are connected to the same AC source, the predetermined times set in the time setting circuits are distributed over a range of values.

When a plurality of the air conditioners are connected to the same AC source, the contact settings of the selector switches are distributed over a range of different settings.

In the controller according to the present invention, it is possible to automatically "stagger", or unselectively start, the air conditioners when the power supply is restored after a power failure. The controllers also permit the timings of the starting of the supplying of power to the compressors to be changed to arbitrary values. By distributing the power supplying timings over a range of values, it is possible to prevent all the compressors from restarting at once when the failed power is returned to normal.

PREFERRED EMBODIMENTS OF THE INVENTION

Figure 2:
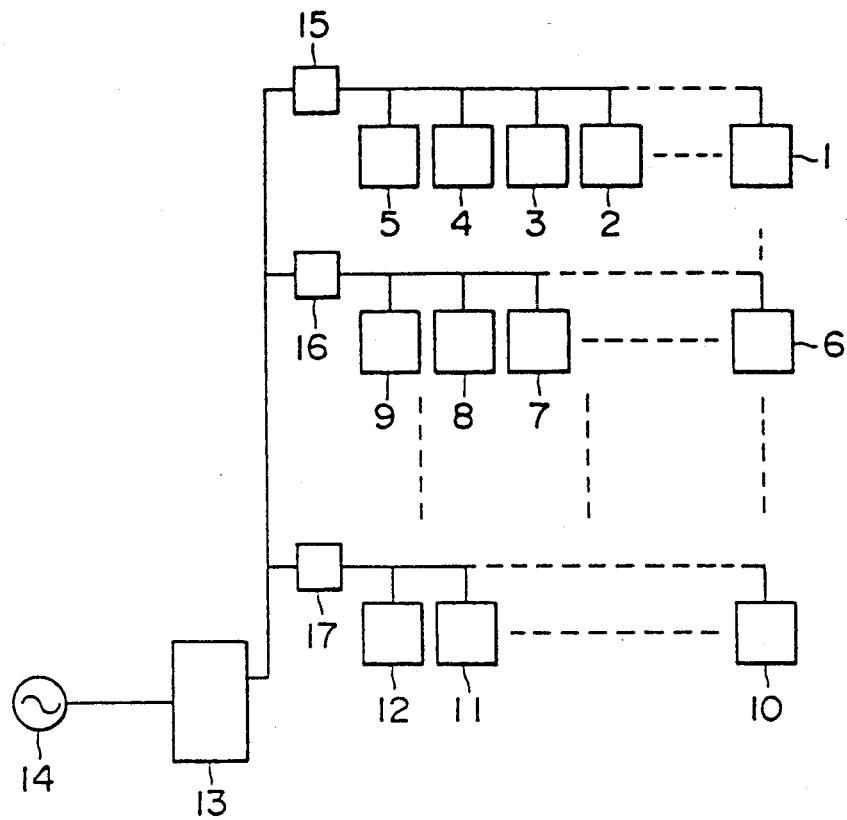
FIG. 2 is a power distribution diagram for supplying AC power to air conditioners.

Referring first to FIG. 2, the air conditioners 1 through 12 are installed in the same building. An AC power facility 13 converts three-phase AC power from utility's three-phase AC power source 14 to a single phase AC power and supplies it to the building. The air conditioners 1-12 are divided into a plurality of groups through circuit breakers 15-17, for example, each group on a different floor. The circuit breakers 15-17 cut off power when the current flowing into the corresponding group becomes higher than a predetermined value. The AC power facility 13 supplies electric power to the groups and has a capacity large enough to operate all air conditioners 1-12. However, when all the air conditioners 1-12 restart simultaneously when the AC power source 14 returns to a normal condition after a failure, a starting current which is about three times as high as the normal operating current flows. The capacity of the AC power facility 13 is not large enough to accommodate such a large starting current and in this case a voltage drop results in the entire system. While this voltage drop may be eliminated by increasing the capacity of the AC power facility 13, it increases the scale of the AC power facility.

In such a facility, the present invention distributes the starting current that occurs when the AC power is restored after failure to prevent a voltage drop in the whole system, without increasing the capacity of the AC power facility.

Figure 3:
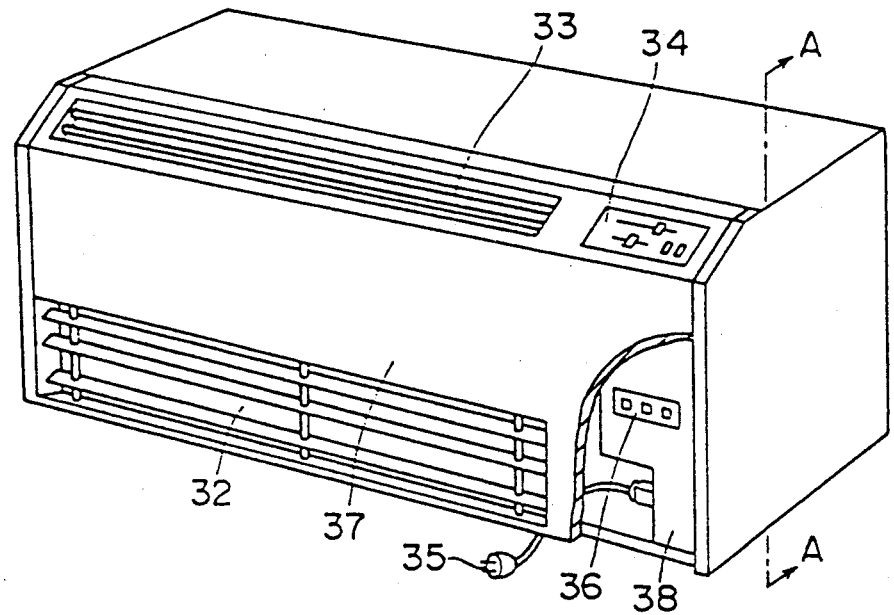
FIG. 3 is a perspective view of the air conditioner shown in FIG. 2.

In FIG. 3, the air conditioner has a motor-driven compressor, a condenser, an expansion device, and an evaporator, all connected in a loop to form a refrigeration cycle and installed in a casing 31. This air conditioner is placed in a wall with its back exposed to open air. Thus, the air conditioner introduces and discharges air to and from the back and exchanges heat with the external air by a heat exchanger. A portion of the air conditioner on the side of A-A in FIG. 3 is embedded in the wall. The opposite part projecting into the room has an intake port 32 and a delivery port 33. The air in the room introduced through the intake port 32 is heated or cooled by the heat exchanger inside and then blown out from the delivery port 33. A controller 34 has a start/-stop switch, a temperature setting knob, and a wind setting switch. An electric plug 35 is connected to a power system supplied by the circuit breaker 15 shown in FIG. 1 so that AC power is supplied from the AC power facility 13 through the switchboard 15. A switch 36 sets a delay time for starting during initialization and is installed in a control box 38 that can be seen when a front panel 37 is removed.

Figure 4:
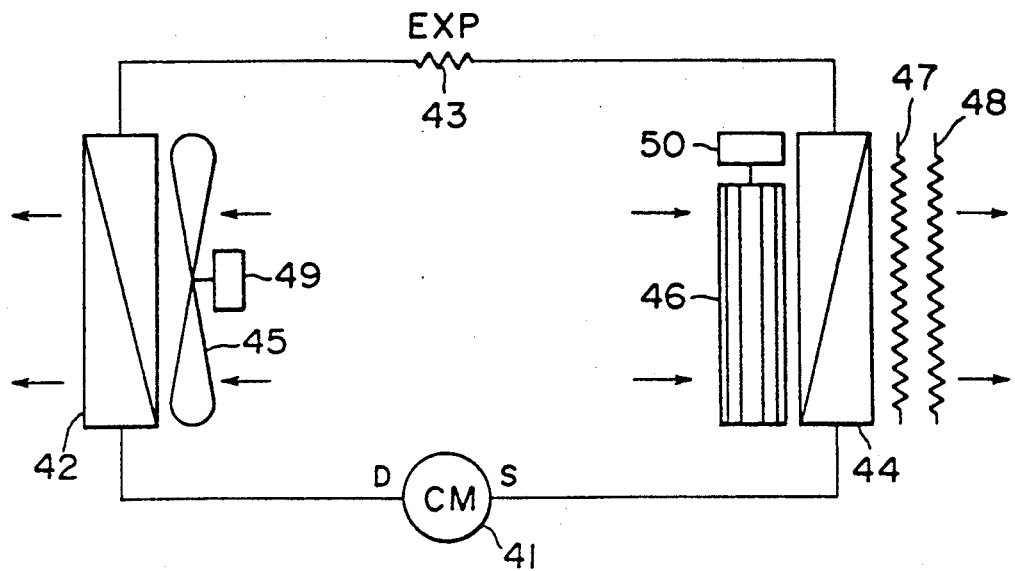
FIG. 4 is a circuit diagram of a cooling medium circuit for the air conditioner shown in FIG. 3.

In FIG. 4, a motor-driven compressor 41 has an AC motor unit and a compressor unit. The compressor 41, condenser 42, expansion device 43 (capillary tube, diffuser valve, etc.), and evaporator 44 are connected in a loop by a cooling pipe. A propeller fan 45 is driven by a single-phase induction motor 49 to send the external air as indicated by the solid arrows, promoting the heat exchange between the air and the condenser 42 (i.e., promoting heat dissipation from the condenser 42). A cross-flow fan 46 is driven by a single-phase induction motor 50 to send the room air as indicated by the solid arrows, promoting heat exchange between the room air and the evaporator 44 (i.e., cooling the room air by the evaporator 44). The motors 49, 50 can be switched between two different speeds. Electric heaters 47 and 48 are installed in a path of the room air delivered by the cross-flow fan 46 so that it can heat the air sent out into the room.

Figure 5:
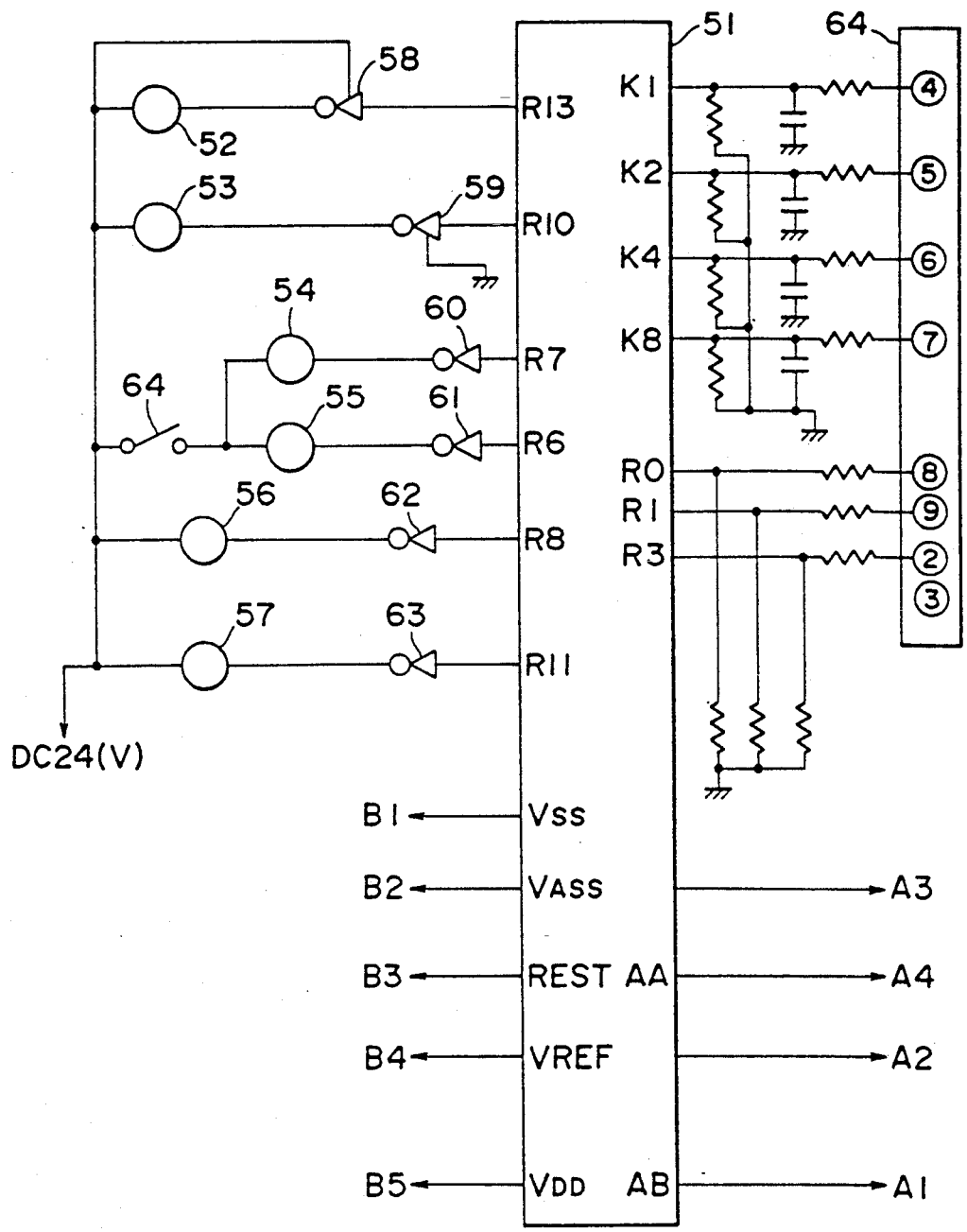
FIG. 5 is a diagram of an electric circuit used for controlling the cooling medium circuit shown in FIG. 4, showing relays.

In FIG. 5, a microprocessor 51 operates according to a stored program when a specified DC voltage is applied between terminals $V_{SS}$ and $V_{DD}$. The microprocessor operation based on the program will be described presently.

Figure 6:
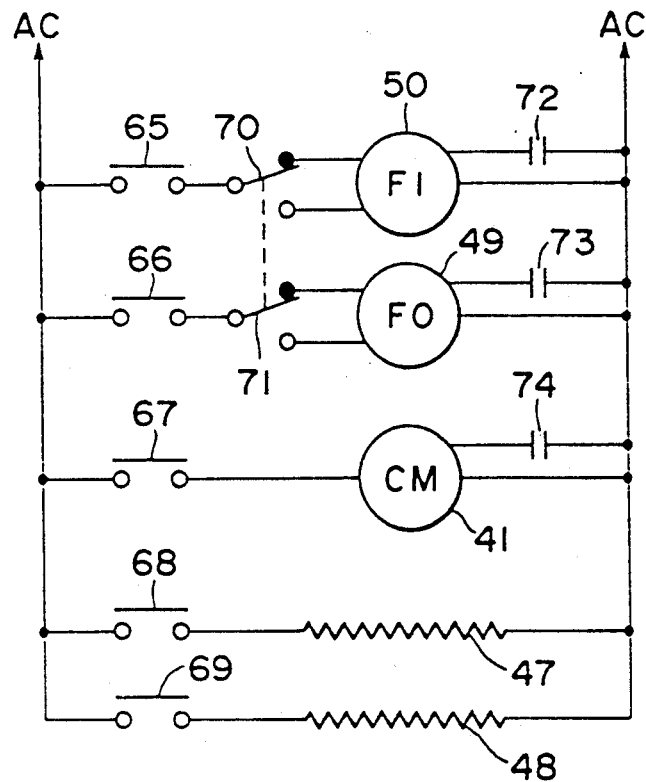
FIG. 6 is a diagram of an electric circuit device controlled by the relays shown in FIG. 5.

Reference numerals 52-57 are power relays. The power relay controls current application to the motor 50, and the power relay 53 switches the rotational speed of the motors 49 and 50. The power relay 54 controls current application to the electric heater 47; the power relay 55 controls current application to the electric heater 48; the power relay 56 controls current application to the compressor 41, and the power relay 57 controls current application to the motor 49. These relays 52-57, as shown in FIG. 6, each have a normally open contact or a switching contact. Drivers 58-63 for the relays 52-57 amplify the power of signals output from the microprocessor 51 so that they can energize the relays 52-57. These drivers 58-63 are contained in a single package IC. A heater protector 64, when the temperature of either the electric heater 47 or 48 or both becomes higher than a specified value, opens the circuit to the relays 54 and 55 to protect the electric heaters 47 and 48 from overheating.

A connector 64 is connected to the switches in the controller 34. Terminals $R_0$, $R_1$, $R_3$ of the microprocessor 51 are output terminals of the scan signals and terminals $K_1$, $K_2$, $K_4$, $K_8$ are input terminals of the scan signals.

In FIG. 6 showing an electric circuit of the equipment (motors, compressor, electric heaters) controlled by energization of the relays 52-57 shown in FIG. 5, reference character AC represents AC power supplied from the circuit braker 15 shown in FIG. 2. A normally open contact 65 closes when the relay 52 is energized; a normally open contact 66 closes when the relay 57 is energized, and a normally open contact 67 closes when the relay 56 is energized. Similarly, a normally open contact 68 closes when the relay 54 is energized, and a normally open contact 69 closes when the relay 55 is energized. Switching contacts 70 and 71 are operated by the energization of the relay 53. The normally open contacts 65-69 and the switching contacts 70 and 71 shown in FIG. 6 represent the states when the relays 58-63 of FIG. 5 are all deenergized.

By energizing the relays 52-57 of FIG. 5, it is possible to turn on the motors 49 and 50, the compressor 41 and the electric heaters 47 and 48 and switch the speed of the motors 49 and 50.

In FIG. 6, reference numerals 72-74 are operation capacitors for the motors 49 and 50 and the compressor 41.

Figure 1:
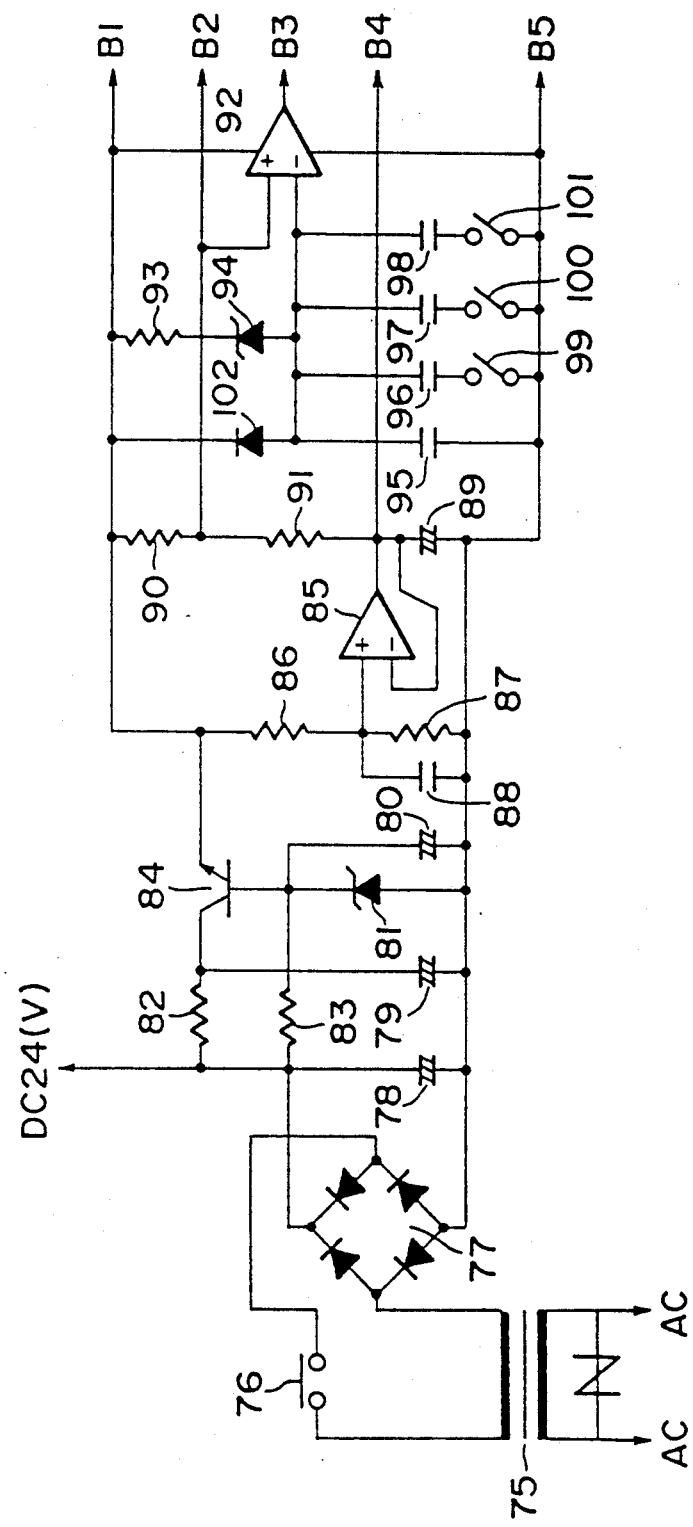
FIG. 1 is an electronic circuit diagram of a time setting circuit according to an embodiment of the present invention.

Referring next to FIG. 1, Symbols $B_1$-$B_5$ are connected to the same symbols in FIG. 5. In FIG. 1, AC represents the same AC power as in FIG. 6. A step-down transformer 75 reduces the voltage of the AC power to about 24 V (effective value). A power switch 76, which is normally closed, switches the contact state between the open and closed state each time it is depressed. A full-wave rectifier circuit 77 has four rectifying diodes connected in a bridge. The DC current produced by the full-wave rectifier circuit 77 is smoothed out by a smoothing capacitor 78 to produce a DC power of 24 V, which is then used for energizing the relays 52-57. Smoothing capacitors 79 and 80, a Zener diode 81, resistors 82 and 83 and a power transistor 84 form a voltage regulating circuit that stabilizes the 24 V DC voltage by the power transistor 84 according to the Zener voltage of the Zener diode 81.

A differential amplifier 85 is used as a voltage follower with the negative feedback set to 100%. Hence, the output voltage of the differential amplifier 85 is determined by the ratio of the resistances 86 and 87, and is supplied to a terminal $V_{REF}$ of the microprocessor 51 of FIG. 5. Reference numerals 88 and 89 denote capacitors for stabilizing the voltage. Resistors 90 and 91 define a reference voltage applied to a terminal $V_{ASS}$ of the microprocessor 51.

A comparator 92 compares the voltage determined by the resistors 90 and 91 and the terminal voltage of the capacitor 95 and switches its output according to the result of the comparison. The capacitor 95 stores electric charge through a series circuit of a resistor 93 and a Zener diode 94. Capacitors 96-98 are connected in parallel with the capacitor 95 by closing switches 99-101. The reset circuit as shown above is energized when the power is supplied from AC and the power switch 76 is closed, outputting the reset signal from the comparator 92 to a terminal REST of the microprocessor 51.

When, with the switches 99-101 open, the power is supplied to stabilize the output voltage of the power transistor 84, the comparator 92 receives at the non-inverting input terminal a voltage determined by the resistors 90 and 91. At the same time, the output voltage of the power transistor 84 becomes higher than the voltage of the Zener diode 94, starting to charge the capacitor 95. When the terminal voltage of the capacitor 95 is higher than the voltage at the non-inverting input terminal of the comparator 92, the output voltage of the comparator 92 changes from a high to a low voltage. The time for changing the output of the comparator 92 from the high voltage to the low voltage depends on the charging time of the capacitor 95, i.e., the resistance of the resistor 93 and the capacitance of the capacitor 95.

Therefore, operating the switches 99-101 to select some of the capacitors 96-98 connected in parallel with the capacitor 95 enables to set the time required to change the output of the comparator, i.e, the time taken by the reset signal to be supplied to the microprocessor 51. For example, the time will be about 0.5 second only with the capacitor 95; about 2 seconds when the capacitor 95 and the capacitor 96 are connected in parallel; about 2 seconds when the capacitor 95 and the capacitor 97 are connected in parallel; and about 6 seconds when the capacitor 95 and the capacitor 98 are connected in parallel. Reference numeral 102 represents a diode that discharges electric charge stored in the capacitors 95-98 when the AC supply is cut off.

Figure 7:
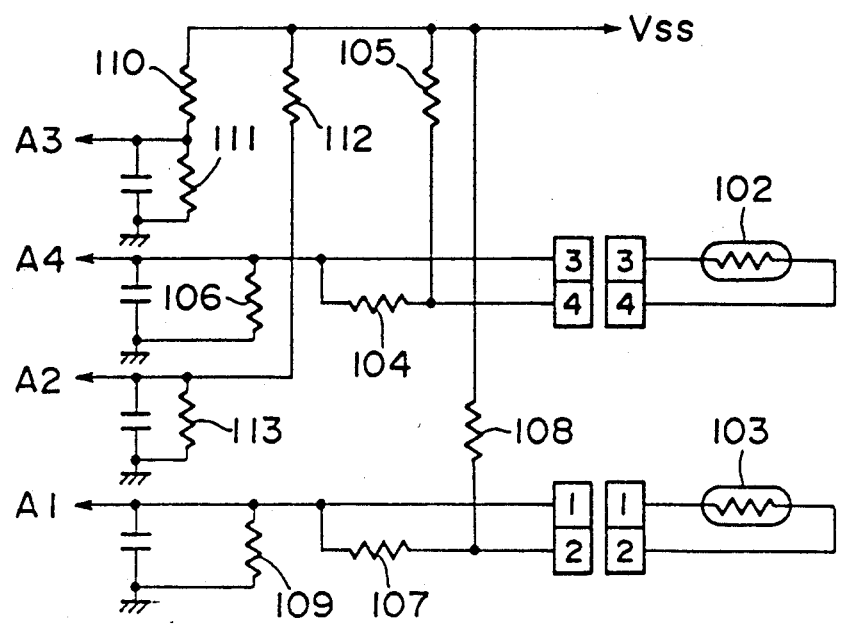
FIG. 7 is a diagram of a thermo circuit connected to $A_1$, $A_2$ and $A_3$ of the electric circuit of FIG. 5.

FIG. 7 shows a thermo-circuit diagram to be connected to lines $A_1$-$A_3$ of FIG. 5. In FIG. 7, a thermistor 102 is installed at a position that permits detection of the temperature of the evaporator 44 and a thermistor 103 is located to detect the temperature of the room to be air-conditioned. A resistor 104 is connected in parallel with the thermistor 102, and resistors 105 and 106 are connected in series with the thermistor 102. A resistor 107 is connected in parallel with the thermistor 103 and resistors 108 and 109 are connected in series with the thermistor 103. Resistors 110 and 111 are connected in series and resistors 112 and 113 are also serially connected to supply regulated voltages to lines $A_{32}$ and $A_2$, respectively. Lines $A_4$ and $A_1$ are supplied with voltages corresponding to the temperatures detected by the thermistors 102 and 103.

The microprocessor 51 performs A/D (analog-to-digital) conversion on the voltages taken in through the lines $A_4$ and $A_1$ and uses them as the temperature data.

Figure 8:
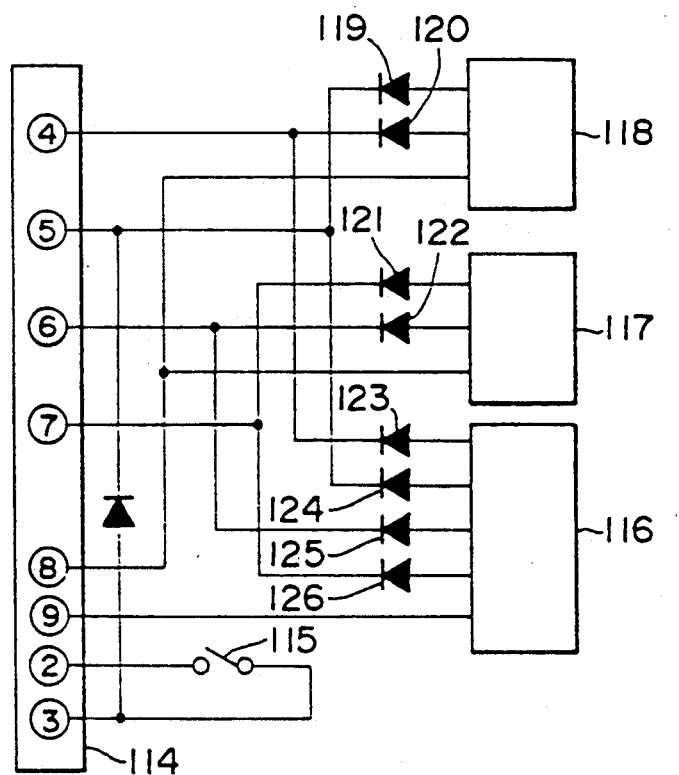
FIG. 8 is an electronic circuit diagram of a switch unit connected to a connector 64 shown in FIG. 5.

FIG. 8 is an electronic circuit of the switch unit connected to the connector 64 of FIG. 5. In FIG. 8, a connector 114, which will be connected to the connector 65 of FIG. 5, is connected with an start/stop switch 115, a room temperature setting switch 116, a speed setting switch 117 for the motors 49 and 50, and a heat/cool selector switch 118.

The start/stop switch 115 is a lock type switch which changes its contact state each time it is depressed and which retains the contact state until depressed. The room temperature setting switch 116, the speed setting switch 117, and the heat-cool selector switch 118 are slide switches that, when operated, close their contacts to produce Gray code signals. The open/close state of the contacts of these switches 115-118 is judged by a scan operation, in which the microprocessor 51 outputs signals from the terminals $R_0$, $R_1$, and $R_3$ and checks which terminal ($K_1$, $K_2$, $K_4$ and $K_8$) the signals return through. Diodes 119-126 restrict the direction of signal flow when the microprocessor 51 performs the scan.

Figure 9:
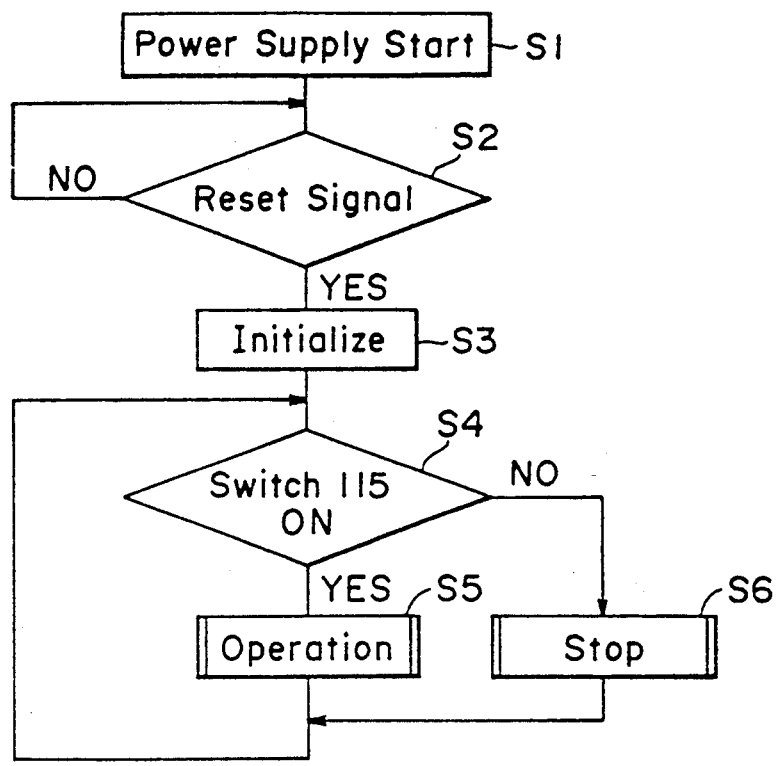
FIG. 9 is a flowchart showing major operations performed by a microcomputer 51 shown in FIG. 5.

FIG. 9 is a flowchart showing the major operations performed by the microprocessor 51 of FIG. 5. After the microprocessor is supplied with drive power at step S1, the program shifts to step S2 where the microprocessor 51 is left uncontrolled until the reset signal is applied to the terminal REST of the microprocessor 51. When the reset signal is applied, the program shifts to step S3 to initialize the microprocessor 51. The time which elapses from the start of the power supply at step S1 until the switches 99-101 of FIG. 1. In case that the air conditioners are installed in the same building, the time for starting the supply of reset signals is properly distributed.

After the reset signal is applied, the step S3 initializes the microprocessor 51. Next at step S4, a determination is made as to whether or not the switch 115 is closed. When the switch 115 is found closed, the program proceeds to step S5 to start the air conditioner. When, for example, the switch 118 is set to the cooling operation, the microprocessor energizes the compressor 41 and the motors 49 and 50 to perform the cooling. If the switch 115 is found open, the program goes to step S6 to stop the air conditioner.

Figure 10:
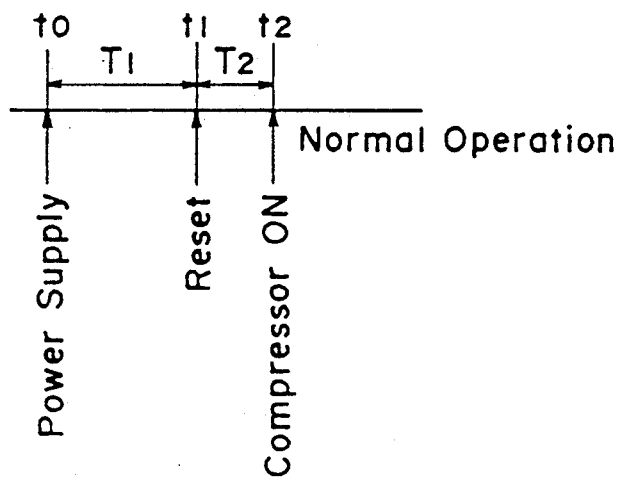
FIG. 10 is a timechart corresponding to the flowchart of FIG. 9.

FIG. 10 is a time chart of the above operation. At time t₀, the power supply is started. This represents the step S1 of FIG. 9. Then, at time t₁, or T₁ after the time t₀, the reset signal is supplied to the microprocessor 51. This represents the moment the decision is made at step S2 in FIG. 9. This delay T₁ is, as explained earlier, set by the switches 99–101. Then, at time t₂, or T₂ after the time t₁, the compressor is energized. The delay time T₂ is the time that is required for the microprocessor 51 to be initialized, make a decision at step S4 and start to turn on the compressor at step S5.

When the air conditioners of the above construction are installed according to the power distribution diagram as shown in FIG. 2, the switches 99–101 of each air conditioner are arbitrarily set. It is statistically apparent that the numbers of air conditioners belonging to each of groups as classified by the setting of these switches 99–101 become equalized as the total number of the air conditioners installed increases.

Therefore, if the switches 99–101 are set arbitrarily at times of installing the air conditioners, the restarting times of the air conditioners are distributed when the power is restored, preventing the starting current from becoming excessively large and therefore reducing the voltage drop in the power supply.

It may be possible to set the switches 9–101 according to a certain rule when installing the air conditioners, for example, turning on only the switch 99 for all the air conditioners on the first floor and turning on only the switch 100 for all the air conditioners on the second floor to make equal the numbers of air conditioners belonging to respective groups.

Figure 11:
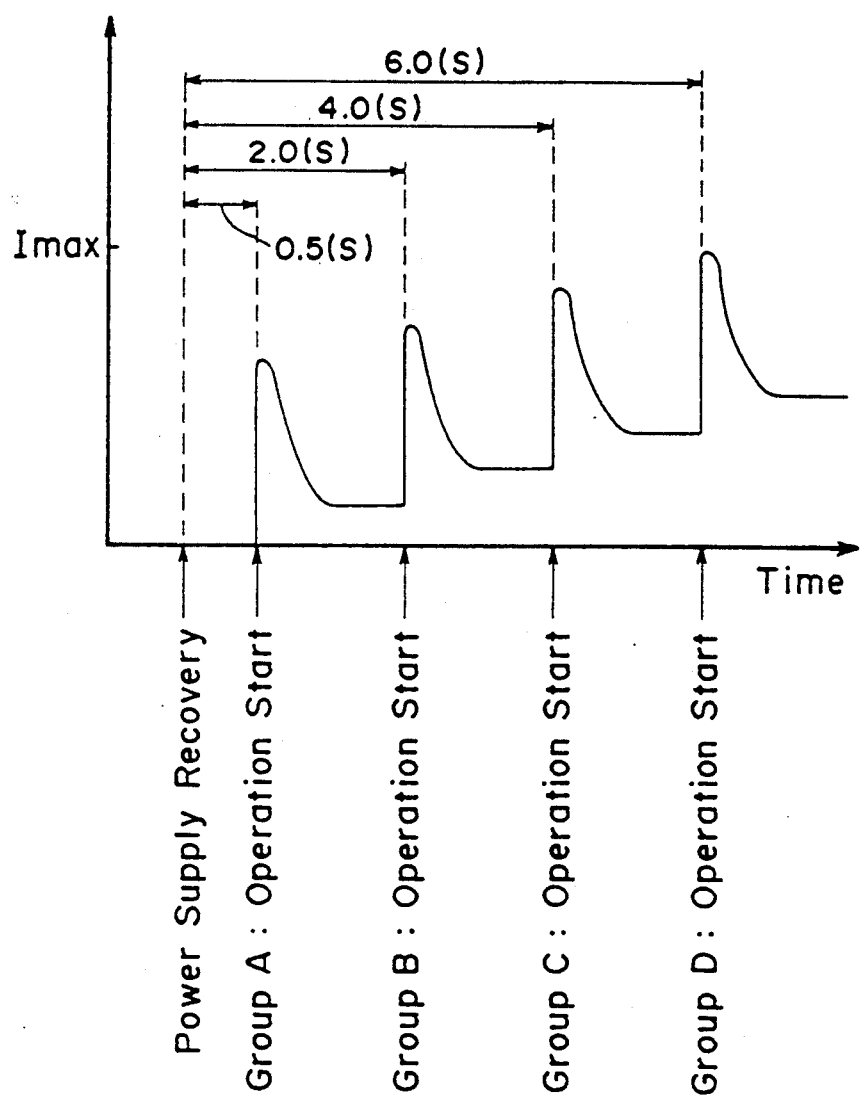
FIG. 11 is a timechart showing changes in the current when operation is performed according to the flowchart of FIG. 9 at the time of power restoration.

For instance, the number of air conditioners belonging to group A with all the switches 99–101 turned off is set to 100; the number of air conditioners belonging to group B with only the switch 99 turned on is set to 100; the number of air conditioners belonging to group C with only the switch 100 turned on is set to 100; and the number of air conditioners belonging to group D with only the switch 101 turned on is set to 100. In this case, the current change when the commercial power is restored is as shown in FIG. 11, from which it is seen that the maximum current is lower than $I_{max}$. The times shown in FIG. 11 are those excluding the microprocessor's processing time. It is assumed that all the air conditioners belonging to the groups A-D were operating before the power failure. It is obvious that turning on two or more of the switches 99–101 will increase the number of groups more than four.

Figure 12:
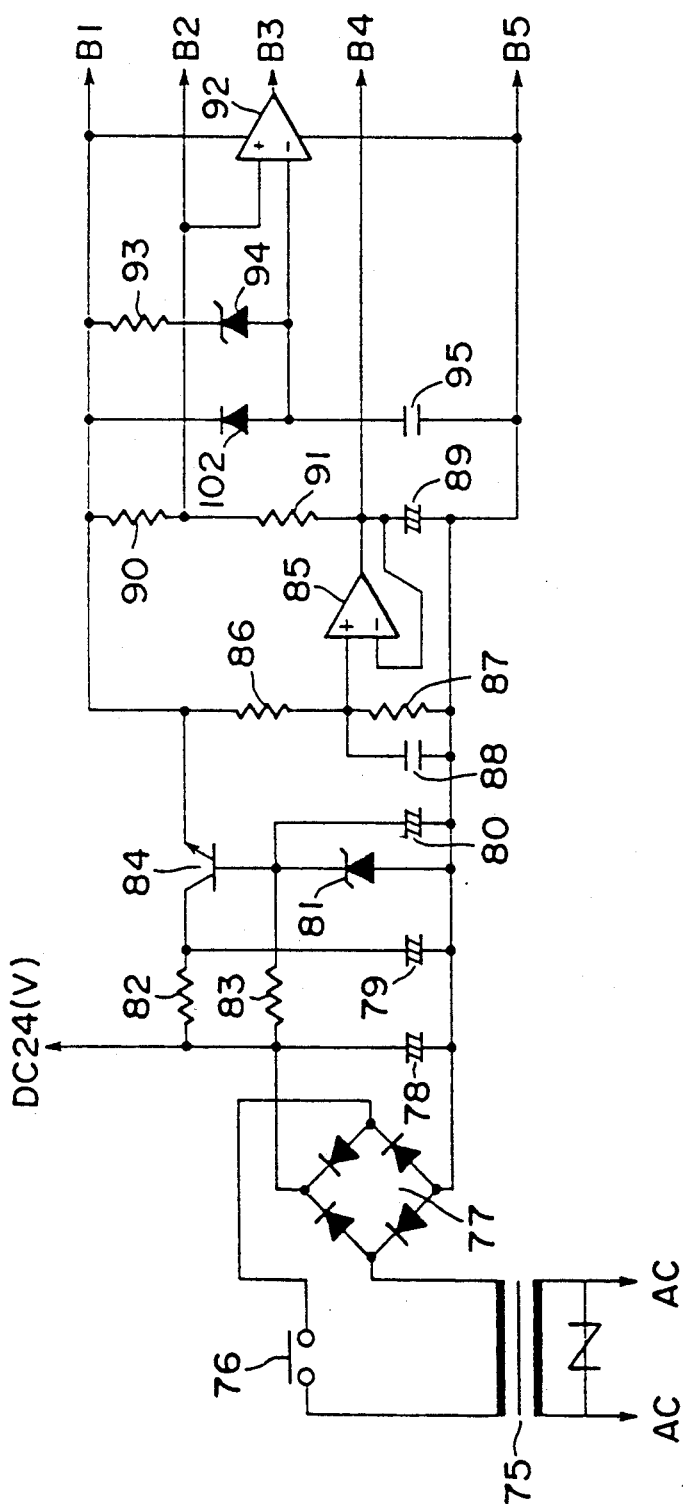
FIG. 12 is a diagram of an electronic circuit according to another embodiment of the present invention.
Figure 13:
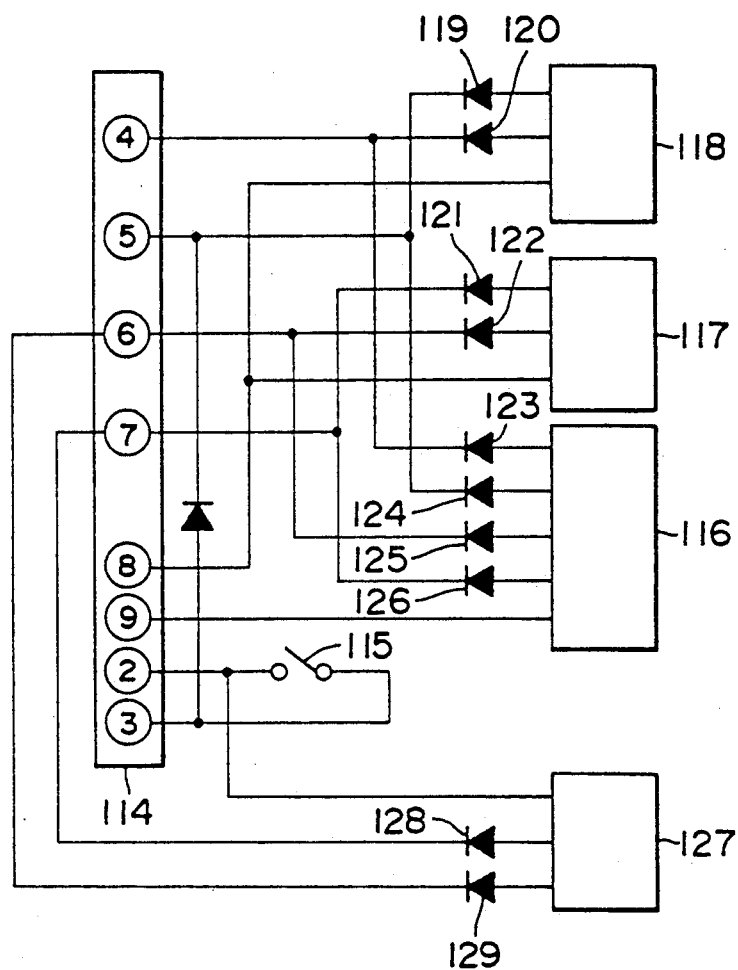
FIG. 13 is a diagram of an electronic circuit according to a further embodiment of the present invention.

FIGS. 12 and 13 are electronic circuits of another embodiment. FIG. 12 corresponds to FIG. 1 of the first embodiment and excludes the capacitors 96–98 and switches 99–101. Other elements are similar to those of the previous embodiment. Thus, the time it takes for the reset signal to be output when the power failure is restored to normal is the one determined by the capacitor 95, i.e., about 0.5 second.

Figure 14:
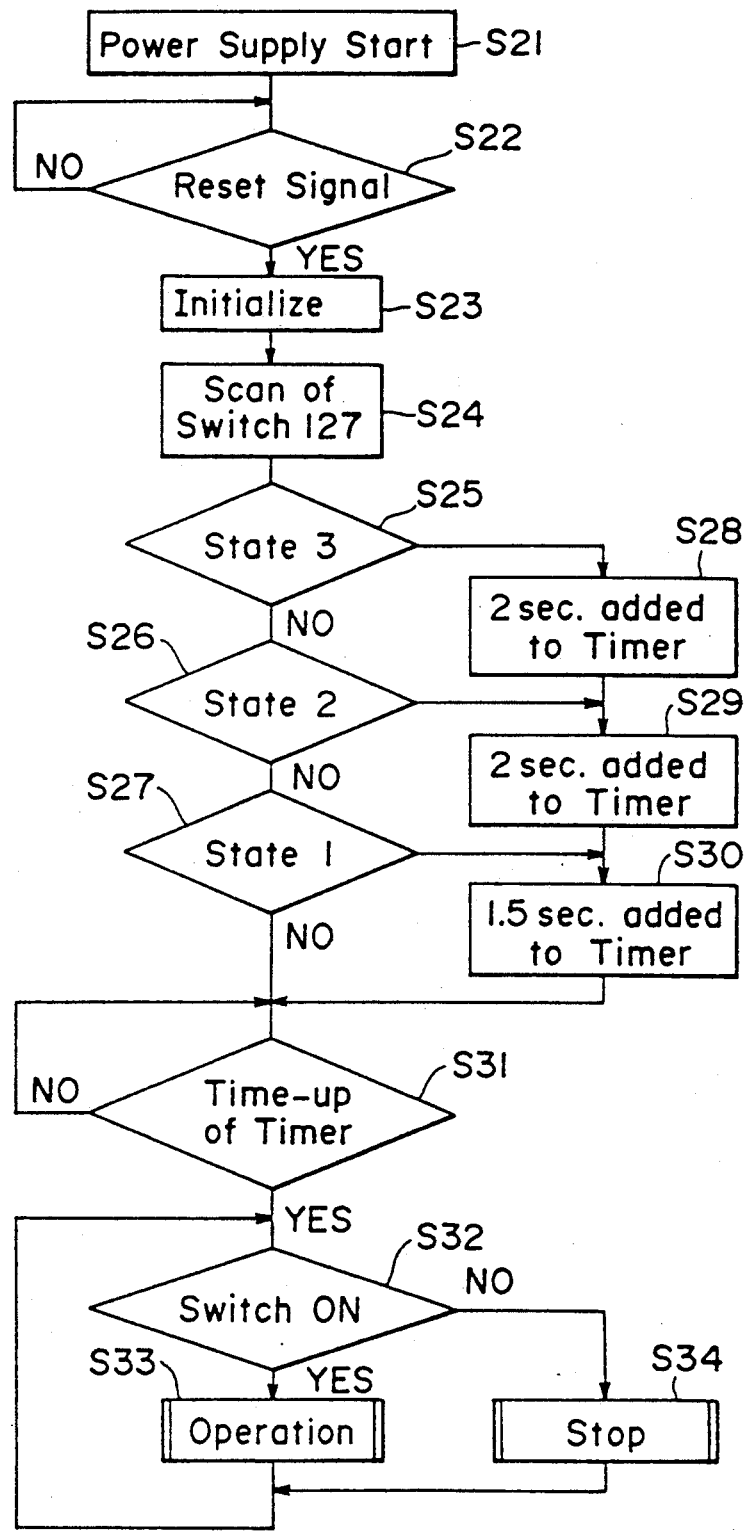
FIG. 14 is a flowchart showing another embodiment of the present invention.

FIG. 13 corresponds to FIG. 8 of the previous embodiment. The circuit of FIG. 13 further includes 12-bit Gray code output switch 127 and diodes 128 and 129 to enable a scan of four states—0, 1, 2, 3—set by the switch 127. When the reset signal is applied from the circuit of FIG. 12 to the microprocessor 51 of FIG. 5, the operation is carried out as shown in the flowchart of FIG. 14.

When at step S21 the power begins to be supplied, the program stands by until the reset signal is applied to the microprocessor 51 at step S22. When the reset signal is received, the program shifts to step S23 to initialize the microprocessor 51, the initialization including such operations as setting the timer to zero. Next, at step S24 the program scans the switch 127 to determine in which state of 0, 1, 2 and 3 the switch 127 is set. Steps S25–S27 are directed to further steps S28–S30 depending on the state of the switch 127. That is, when the step S25 decides the switch 127 to have been set in the state "3", the steps S28 to S30 are carried out to set the timer to 5.5 seconds (i.e., adding 2, 2 and 1.5 seconds together by performing the steps S28–S30 successively). When the switch 127 is found to be set in state "2", the timer is set to 3.5 seconds; when it is found to be set in state "1", the timer is set to 1.5 seconds; when the switch is in state "0", the timer is left set to 0 second.

After the timer setting is done in this way, the timer is started. The timer may be a hardware timer that is continuously performing a decrementing operation down to zero. In this case there is no need to include the operation to start the time.

At step S31, the program waits until the timer's time is up. When the step S31 decides that the timer's time is up, the program proceeds to step S32, step S33, and step S34. The operations of these steps S32–S34 are the same as those of the steps S4–S6 shown in FIG. 9.

When the operation is performed according to the flowchart of FIG. 14, there is a time delay of about 0.5 second from the start of the power supply to the start of the compressor, as in the case of the operation according to the flowchart of FIG. 9. Hence, when the flowchart of FIG. 14 is used, the time elapsed from the start of supplying power to the actual supply of current to the compressor is 0.5 second when the state of the switch 127 is "0". When the switch status is "1", the time delay will be 2.0 seconds; when it is "2", the time delay will be 4.0 seconds; and when it is "3", the time delay will be 6.0 seconds.

Where the air conditioners of the this embodiment are divided into groups A-D as in the previous embodiment, the start timings and currents of the air conditioners belonging to respective groups when the power is restored to normal will be identical to those of FIG. 11, providing the similar effect to that of the previous embodiment.

Since the air conditioners according to present invention are each provided with a time setting circuit that can arbitrarily change the time which elapses from the start of power being supplied to the application of the reset signal to the microprocessor in the controller, it is possible to set to an arbitrary value the delay time for starting the air conditioners when the power is restored to normal after a power failure.

Therefore, when a large number of air conditioners are connected to the same power source, the settings of the timer circuits of the air conditioners are distributed over a range so that the air conditioners can be started one after another automatically when power failure is restored to normal, preventing starting currents of many air conditioners from flowing at once and therefore reducing the voltage drop in the power supply.

In other words, because this configuration ensures automatic staggering of air conditioners one after another, it eliminates the need for a controller that controls successive restarting of air conditioners at times of power recovery and also obviates the signal lines that connect the sequential restarting controller and individual air conditioners.

The similar effects can be obtained if a switching signal for the time delay is given to the microprocessor from a switch when the microprocessor is started.

What is claimed is:

1. A control apparatus of an air-conditioner comprising a refrigeration circuit having a compressor driven by AC power from an AC power source, a condenser, an expansion device, and an evaporator wherein said condensor, said expansion device and said evaporator are connected by suitable refrigerant conduits in a refrigerant flow relationship including:
   an operation switch selectively set to one of a start position and a stop position;
   an electric power supply circuit for rectifying and regulating AC power supplied from said AC power source into a DC power;
   a microprocessor, driven by said DC power supplied from said electric power supply circuit, for executing a program after a reset signal is supplied;
   wherein said program controls a supply of said AC power from said AC power source to said compressor in accordance with a difference between a room temperature and a set temperature while said operation switch is selectively positioned at said start position;
   a reset circuit for outputting said reset signal to said microprocessor when a predetermined time is elapsed after a voltage of said DC power becomes higher than a predetermined voltage, and
   a time setting circuit for changing said predetermined time of said reset circuit.

2. A control apparatus according to claim 1, wherein a plurality of the air conditioners are connected to said AC power source, said plurality of air conditioners being divided into a plurality of groups, each group of said plurality of groups being composed of air conditioners having the same said predetermined time.

3. A control apparatus of an air-conditioner comprising a refrigeration circuit having a compressor driven by AC power from an AC power source, a condenser, an expansion device, and an evaporator wherein said condensor, said expansion device and said evaporator are connected by suitable refrigerant conduits in a refrigerant flow relationship including:
   an operation switch selectively set to one of a start position and a stop position;
   an electric power supply circuit for rectifying and regulating AC power supplied from said AC power source into a DC power;
   a microprocessor, driven by said DC power supplied from said electric power supply circuit, for executing a main program after a reset signal is supplied;
   wherein said main program controls a supply of said AC power from said AC power source to said compressor in accordance with a difference between a room temperature and a set temperature while said operation switch is selectively positioned at said start position;
   a reset circuit for outputting said reset signal to said microprocessor after a voltage of said DC power becomes higher than a predetermined voltage;
   a time setting switch for setting a delay time, and
   a sub-program for delaying an execution of said main program for a period of said delay time after said reset signal is supplied from said reset circuit.

* * * * *